United States Patent
Schwuger et al.

(10) Patent No.: US 6,820,514 B1
(45) Date of Patent: *Nov. 23, 2004

(54) SYNCHRONIZER BODY COMPRISING AN INTEGRATED DETENT ELEMENT

(75) Inventors: Josef Schwuger, Hochstadt (DE); Rudolf Sinner, Bubenreuth (DE); Hartwig Waldert, Aisch (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/958,877

(22) PCT Filed: Mar. 21, 2000

(86) PCT No.: PCT/EP00/02461

§ 371 (c)(1),
(2), (4) Date: Nov. 1, 2001

(87) PCT Pub. No.: WO00/63573

PCT Pub. Date: Oct. 26, 2000

(30) Foreign Application Priority Data

Apr. 16, 1999 (DE) .......................................... 199 17 231

(51) Int. Cl.[7] .............................................. F16H 55/17
(52) U.S. Cl. ........................ 74/434; 74/527; 192/53.32
(58) Field of Search ........................ 192/53.361, 53.36, 192/70.2, 53.32, 53.34, 53.341, 53.342, 53.4; 74/339, 434, 527

(56) References Cited

U.S. PATENT DOCUMENTS

| | | | |
|---|---|---|---|
| 4,131,032 A | | 12/1978 | Warland et al. |
| 4,132,298 A | * | 1/1979 | F'Geppert .............. 192/53.342 |
| 5,085,303 A | * | 2/1992 | Frost ........................ 192/53.32 |
| 5,887,688 A | * | 3/1999 | Ploetz et al. ........... 192/53.341 |
| 6,186,301 B1 | * | 2/2001 | Schwuger et al. ....... 192/53.32 |
| 2002/0063030 A1 | * | 5/2002 | Fernandez ............. 192/53.341 |

FOREIGN PATENT DOCUMENTS

| | | |
|---|---|---|
| DE | 2537495 | 3/1976 |
| DE | 3411351 | 3/1984 |
| DE | 19580558 | 1/1998 |
| DE | 19821565 | 11/1999 |
| DE | 19832729 | 1/2000 |

* cited by examiner

*Primary Examiner*—David Fenstermacher
(74) *Attorney, Agent, or Firm*—Muserlian, Lucas and Mercanti

(57) ABSTRACT

A synchronizer body (1) of a synchronizing device for manual transmissions comprising a base body (2) made out of sheet metal by shaping, an inner toothing (11), and an outer toothing (10) and at least one reception (5) formed in the base body (2) for receiving a spring-loaded detent element (7) forms an assembled unit with the spring-loaded detent element (7).

10 Claims, 3 Drawing Sheets

SYNCHRONIZER BODY COMPRISING AN INTEGRATED DETENT ELEMENT

This application is a 371 of PCT/EP00/02461 filed Mar. 21, 2000.

DESCRIPTION

1. Field of the Invention

The invention concerns a synchronizer body of a synchronizing device for manual transmissions, said synchronizer body comprising a base body, an inner toothing, an outer toothing and at least one reception formed in the base body for a spring-loaded detent element, wherein:

the inner toothing of the synchronizer body meshes rotationally fast with a mating toothing of a transmission shaft, the outer toothing of the synchronizer body receives a sliding sleeve, the base body is composed of at least a first shaped sheet metal part and a second shaped sheet metal part, and the first and second shaped sheet metal parts are made separately by a shaping method and then aligned and fixed to each other.

2. Background of the Invention

Synchronizing devices are used in modern manual transmissions to assure a comfortable shifting between the individual gear steps. During the shifting operation, the peripheral speed of a gearwheel is matched to the peripheral speed of the transmission shaft with the help of various elements of the synchronizing device, and a positive engagement is then established between the transmission shaft and this gearwheel. Different examples of embodiment of synchronizing devices are described in the German technical textbook "Zahnradgetriebe" by Jonannes Loomann, 1996, Page 452 ff. The synchronizer body is an important component of the synchronizing device. The transmission shaft and the sliding sleeve of the synchronizing device are connecting rotationally fast to each other by the synchronizer body. This is effected as a rule by the fact that, on the one hand, the synchronizer body is positively engaged in peripheral direction with the transmission shaft by a wedge or a toothing profile of its hub, and, on the other hand, through an outer toothing of its sleeve carrier, the synchronizer body receives the sliding sleeve on its outer diameter for sliding along the central longitudinal axis of the transmission shaft. Depending on its configuration, the synchronizer body further serves as a stop or a guide element for synchronizer rings or friction rings.

The synchronizer body frequently comprises on its outer periphery, equally spaced receptions for detent elements such as detent pins and detent balls, and for thrust members. The detent elements retain the sliding sleeve in its central position when no gearwheel is engaged. These detent elements are pressed under spring bias into a detent groove of the sliding sleeve, or the detent element acts on a thrust member that, in its turn, is received in a detent groove of the sliding sleeve.

In such synchronizing devices, the thrust members arranged in the receptions of the synchronizer body serve to effect pre-synchronization during a shifting operation i.e., they serve to move the respective synchronizer ring against a friction surface of the adjacent coupling body or intermediate ring e.g. for double cone synchronization of the synchronizing device. Depending on the configuration of the synchronizing assembly, the thrust member is biased into a detent groove in the sliding sleeve either directly by one or two springs or by a biased detent pin or detent ball. When the sliding sleeve is displaced axially for gear selection, the thrust member is pushed with one thrust end axially against the synchronizer ring by the inner contour of the detent groove of the sliding sleeve. This leads to the synchronizer ring being pressed against the friction surface.

Prior art synchronizer bodies are made either by chip removing methods or without chip removal.

Fabrication by chip removal is complicated and expensive. It involves the use of the most different kinds of machining methods to give the blanks their final shape. A particularly time-consuming and cost-intensive factor is the production of the toothing and the aforementioned receptions for the detent elements. The receptions are made e.g. by broaching or boring out of the solid material of the blank.

Such synchronizer rings are very compact and closed structures and therefore have a high proportion of material and weight. Material and fabrication costs are therefore very high, particularly in mass production. An advantage of such synchronizer bodies is their high strength under load.

For the fabrication of synchronizer bodies without chip removal, the base material is sheet metal or strip material, for example, which is brought into the required shape by cutting-off and shaping. The thickness of the base material and its weight are determined by functional requirements and the required strength of the finished part.

A major part of the base material used in fabrication is actually utilized for forming the geometric shape of the synchronizer body and is not lost through complicated machining. A synchronizer body made without chip removal therefore also does not contain any superfluous material but only as much as is necessary for its function and strength.

A generic synchronizer body is described in AS 25 37 495. This synchronizer body is formed by two shaped sheet metal parts connected to each other at their end faces. Their joining plane forms the central transverse plane of the synchronizer body. These shaped sheet metal parts are made by shaping without chip removal and each of them forms one half of the outer toothing and one half of the inner toothing as well as of the base body.

The advantage of synchronizer bodies made by shaping is that they can be manufactured in mass production with a great economy of material and time. The manufacturing costs are therefore low but, hitherto, synchronizer bodies made in this way have not gained general acceptance because, among other things, the costs of making the shaping tools are high. For this reason, the tools used are of a very simple type and these only pay when larger numbers of units are produced. Besides this, the relatively thin configuration of such synchronizer bodies offers little room for the realization of complex shapes adapted to the sophisticated requirements of modern synchronizing devices.

The aforesaid detent elements are configured as a rule as balls or pins loaded by one or more springs. For the assembly of the synchronizing device, the detent elements are inserted into the receptions separately from the springs, or in the form of a pre-assembled locking unit. The pre-assembled locking unit is generally formed by a housing in which the detent element and the spring are pre-stressed and retained. A drawback encountered in the assembly of such synchronizing devices is that the said elements can fall out of the receptions during assembly which is then incomplete, or parts are confused. The pre-assembly of the locking units also causes additional fabrication work and costs.

SUMMARY OF THE INVENTION

The object of the invention is therefore to provide a synchronizer body whose main components are made without chip removal, and more particularly, by a shaping method, and can be produced at low cost not only in mass production but also in small numbers.

The synchronizer body can be manufactured economically, particularly in mass production. The base body of this synchronizer body comprises a first and second shaped sheet metal part made by a shaping method. Each of the first and the second shaped sheet metal parts comprises a toothing profile on its inner and outer periphery. When these shaped sheet metal parts have been fixed to each other, the toothing profiles on the outer peripheries from the outer toothing. The toothing profiles on the inner peripheries form the inner toothing on the base body when the shaped sheet metal parts have been fixed to each other.

- the inner toothing (11, 22) of the synchronizer body (1, 14, 24) meshes rotationally fast with a mating toothing of a transmission shaft,
- the outer toothing (10, 21) of the synchronizer body (1, 14, 24) receives a sliding sleeve,
- the base body (2, 15) is composed of at least a first shaped sheet metal part (3, 16) and a second shaped sheet metal part (4, 17),
- the first and second shaped sheet metal parts (3, 4, 15, 17) are made separately by a shaping method and then aligned and fixed to each other,
- at least one radially extending reception (5, 18, 26) comprising an opening toward the sliding sleeve is formed between the shaped sheet metal parts (3, 4) by at least one shaped region (3c, 4c, 16c, 17c),
- the detent element (7) projecting at least partly out of the opening and acting on the sliding sleeve or on a thrust member is received in the reception (5, 18, 26), and
- under action of at least one spring (6, 20, 28) supported in the reception, the detent element (7) is biased against a securing element (9) that is arranged on the opening.

In another embodiment a synchronizer body whose body likewise comprises a first and a second sheet metal part is made by shaping. In contrast to the synchronizer body described before, the inner and the outer toothing of this synchronizer body are made separately from the base body. The outer toothing is preferably a one-piece shaped sheet metal part, or it is composed of shaped sheet metal segments. The inner toothing is configured on a hub made preferably by a non-chipping fabrication method. The individual components are fixed to one another after their fabrication. The synchronizer body can therefore be made with a plurality of tools of relatively simple design and is therefore particularly suitable for production in smaller numbers.

The inner toothing (32a) of the synchronizer body (31) meshes rotationally fast with a mating toothing of a transmission shaft, the outer toothing (35) of the synchronizer body (31) receives a sliding sleeve, the base body (36) is composed of at least a first shaped sheet metal part (33) and a second shaped sheet metal part (34), the first and second shaped sheet metal parts (33, 34,) are made separately by a shaping method and then aligned and fixed to each other, at least one radially extending cylindrical reception (37) is formed between the shaped sheet metal parts (33, 34) by at least one shaped region (33a, 34a), the inner toothing (32a) is configured on a separately fabricate hub (32), the outer toothing (35) is formed by at least two semi-shell-shaped segments or by a separate annular element, the outer toothing (35) and the inner toothing (32a) are aligned to and fixed on the base body (36), the reception (37) continues into a hole (41) that is made in radial direction in the outer toothing (35) and comprises an opening towards the sliding sleeve, at least one spring-loaded detent element (7) that projects at least partly out of the opening and acts on the sliding sleeve or on a thrust member is received in the reception (37), and under action of at least one spring (38) supported on the hub (32), the detent element (7) is biased against a securing element (9,) that is arranged on the opening.

The coherent inventive concept behind the synchronizer bodies is that at least one of the shaped sheet metal parts that form the base body comprises a shaped region. When the shaped sheet metal parts have been fixed to each other, this shaped region forms the reception for the locking element. The invention further provides that the locking element including one or more springs for biasing the locking element is retained secure against loss on the base body, or on the toothing, by a securing element. This means that the synchronizer bodies are pre-assembled with the detent elements to form a structural unit. The occurrence of the aforesaid errors during assembly of the synchronizing device is excluded.

The detent elements are inserted into the synchronizer body of the first embodiment preferably after the two shaped sheet metal parts have been fixed to each other. The detent element, pre-stressed against the spring, is then secured by the securing element on the opening.

In preferred embodiments of the invention in this embodiment, the securing element is formed plastically out of the material of at least one of the two shaped sheet metal parts on the opening and forms a projection. This projection is formed for example, by stamping. This is an inexpensive method of making the securing element and can be combined with the insertion of the spring and the detent element into the reception.

In another embodiment of the invention of the first embodiment, the securing element is formed by a bushing. This bushing, preferably configured as a thin-walled, shaped component, is perforated on the bottom, slipped onto the detent element and pressed into the reception or, again, secure on the opening by a stamping.

In another embodiment, the securing element is a disk comprising a hole. The disk is pressed into the opening and/or, again, retained by stampings. The detent element extends into the hole of the disk.

A preferred embodiment of a securing element for securing a detent element in a synchronizer body of the second embodiment is a projection that extends at the opening out of the material of the outer toothing. This projection can be configured as a continuous rim and is again formed preferably by stamping.

Finally, in preferred embodiments of the synchronizer bodies according to either embodiment, the detent element is constituted by a ball or a pin.

BRIEF DESCRIPTION OF THE DRAWINGS

The invention will be described in the following with reference to examples of embodiment. In the appended drawings.

DETAILED DESCRIPTION OF THE DRAWINGS

Figure 1:
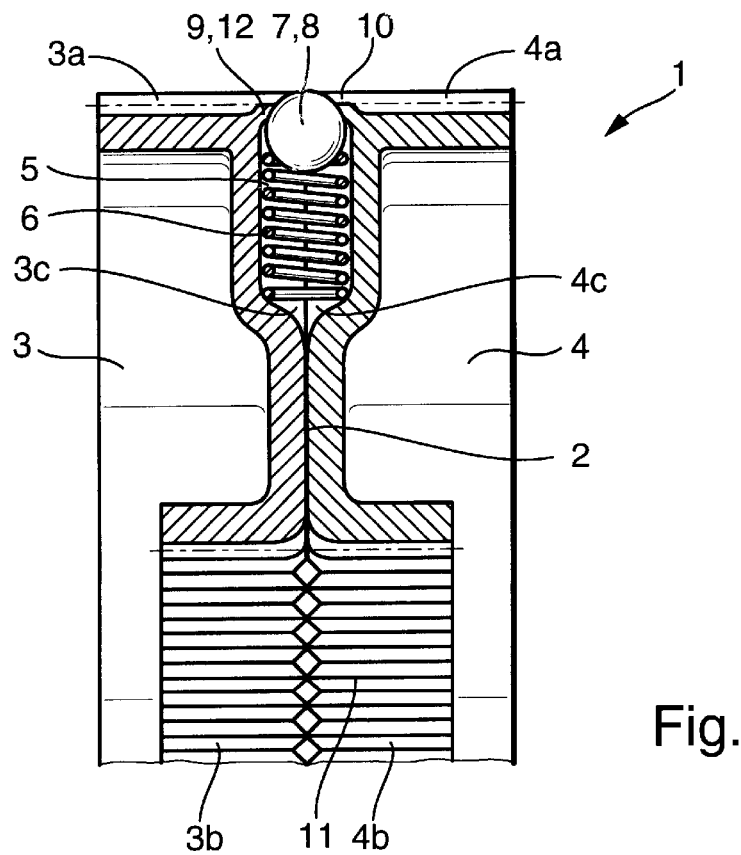
FIG. 1 is a partial sectional view of an example of embodiment of a synchronizer body whose base body is composed of two semi-shell-shaped sheet metal parts formed integrally with the toothing.
Figure 2:
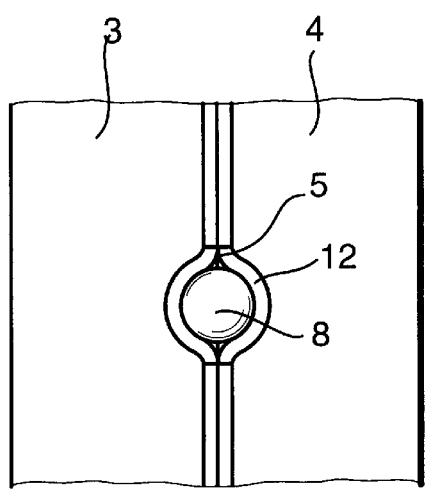
FIG. 2 is a partial top view of the synchronizer body of FIG. 1.

FIG. 1 shows a synchronizer body identified at 1 whose base body 2 is formed by a first shaped sheet metal part 3 and a second shaped sheet metal part 4. Both these shaped sheet metal parts 3 and 4 are semi-shell-shaped. Outer toothing profiles 3a and 4a are formed on the outer peripheries of the first shaped sheet metal part 3 and of the second shaped sheet metal part 4 respectively, and inner toothing profiles 3b and 4b are formed on the inner peripheries of the shaped sheet metal parts 3 and 4 respectively. The outer toothing profiles 3a, 4a form the outer toothing 10 on the base body 2, and the inner toothing profiles 3b, 4b form the inner toothing 11. The first and second shaped sheet metal parts 3 and 4 comprise shaped regions 3c and 4c respectively. These shaped regions 3c and 4c together form a reception 5 on the base body 2. In the reception 5 are lodged a detent element 7 configured as a ball 8, and a compression spring 6. The compression spring 8 biases the ball 8 against a securing element 9 that is arranged on the opening of the reception 5. As can be seen in FIG. 2, the securing element 9 is formed by a rim 12. One half of the rim 12 is formed out of the material of the first shaped sheet metal part 3 and the other half of the rim 12 is formed out of the material of the second shaped sheet metal part 4.

Figure 3:
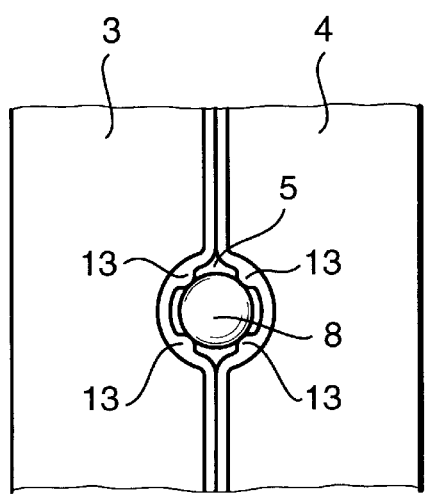
FIG. 3 is an alternative embodiment of the securing element of FIG. 2.

FIG. 3 shows an alternative configuration of the securing element 9. The securing element 9 is formed by projections 13 shaped out plastically from the material of the first and second shaped sheet metal parts 3 and 4 on the opening 5.

Figure 4:
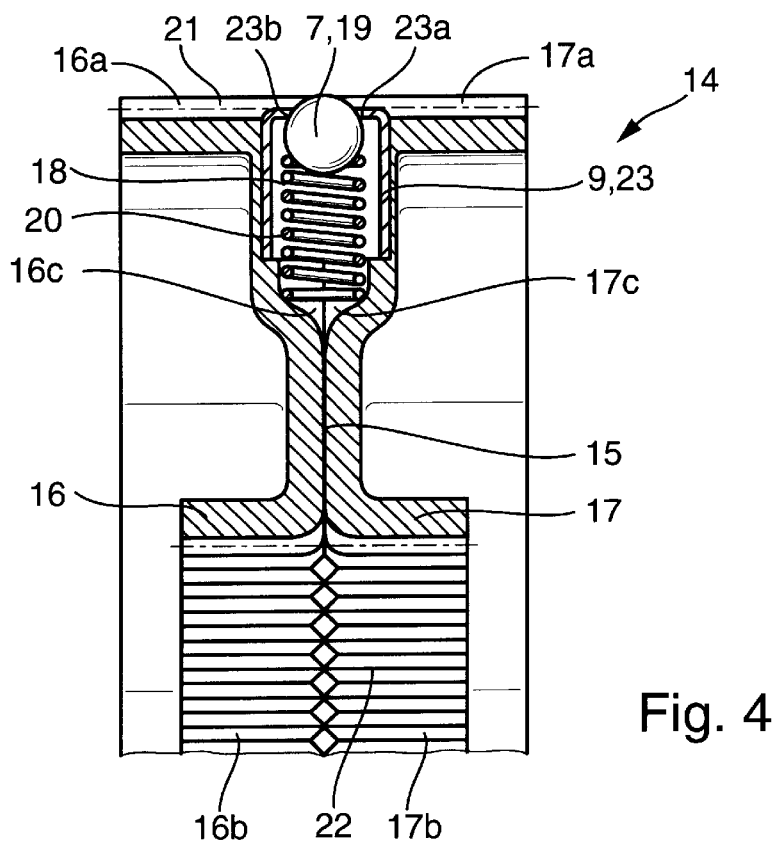
FIG. 4 is a partial sectional view of an example of embodiment of a synchronizer body whose detent element is secured by a bushing.

An example of embodiment of a synchronizer body 14 is illustrated in FIG. 4. The synchronizer body 14 comprises a base body 15, detent elements 7 in the form of balls 19 and compression springs 20. The base body 15 is again made up of a first shaped sheet metal part 16 and a second shaped sheet metal part 17. The outer toothing profiles 16a and 17a on the first and second shaped sheet metal parts 16 and 17 respectively, form the outer toothing 21 and the inner toothing profiles 16b and 17b form the inner toothing 22 of the synchronizer body 14. Shaped regions 16c of the first shaped sheet metal part 16 and 17c of the second shaped sheet metal part 17 form receptions 18 in which detent elements 7 in the form of balls 19, and compression springs 20 are lodged. Each compression spring 20 biases a ball 19 against a securing element 9 configured as a bushing 23. The bottom 23a of the bushing 23 comprises a hole 23b. The ball 19 passes partially through the hole 23b. The bushing 23 is pressed into the base body 15.

Figure 5:
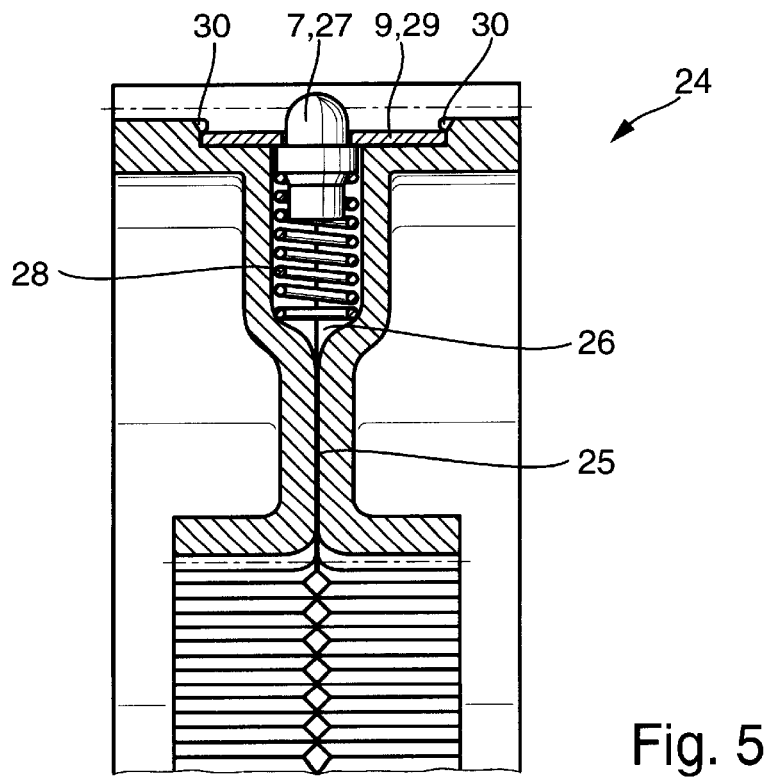
FIG. 5 is a partial view of an example of embodiment of a synchronizer body in which the securing element is formed by a disk.

FIG. 5 is a partial view of a longitudinal section through a synchronizer body 24. A reception 26 is formed in the base body 25 of the synchronizer body 24. A detent element 7 in the form of a pin 27, and a compression spring 28 are lodged in the reception 26. The compression spring 28 biases the pin 27 against a perforated disk 29 that is arranged on the opening of the reception 26 and pressed in. The disk 29 is additionally secured by stampings 30 that are formed plastically out of the material of the base body 25.

Figure 6:
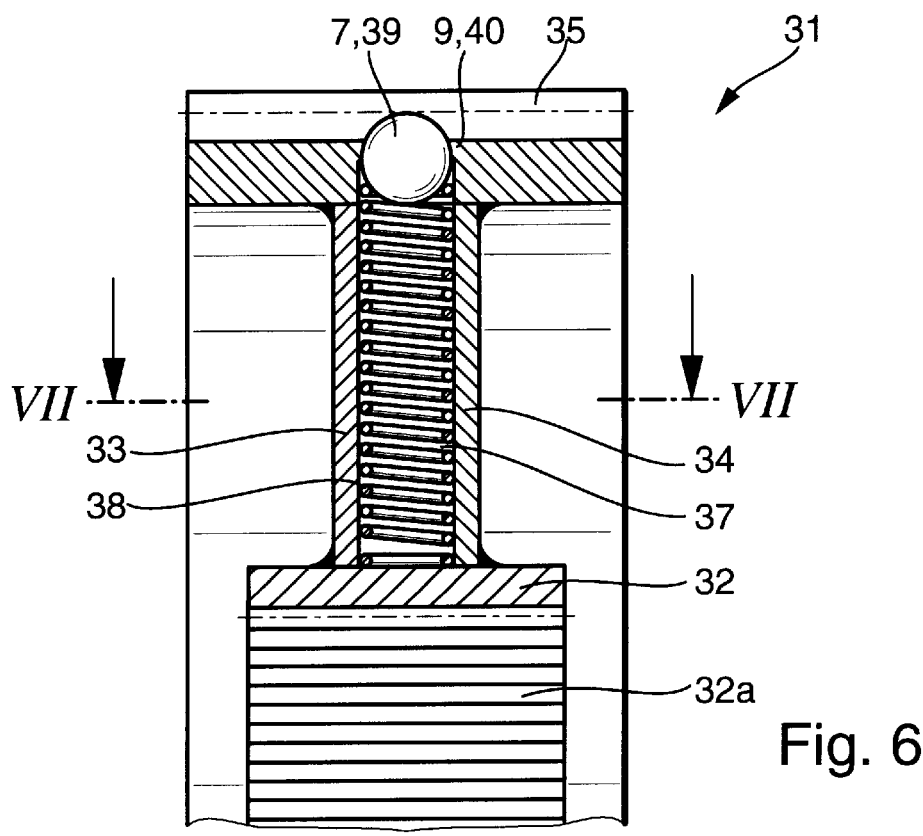
FIG. 6 is a partial sectional view of an example of a synchronizer body whose outer toothing and inner toothing are made separately from the base body.
Figure 7:
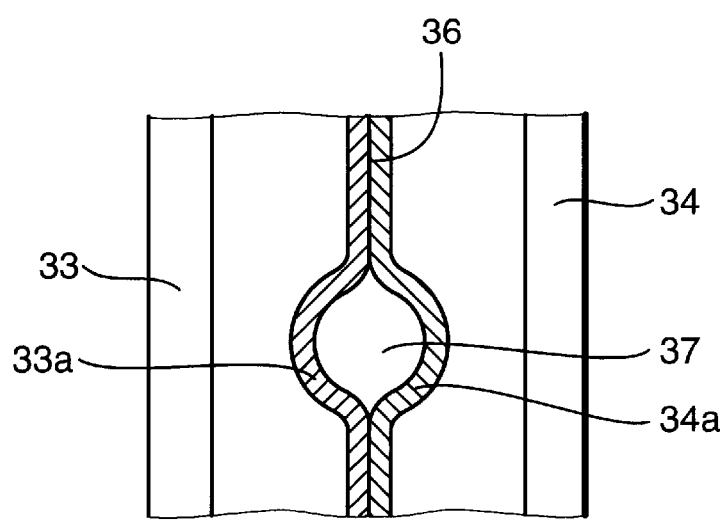
FIG. 7 is a partial sectional view of the synchronizer body of FIG. 6 along line VII—VII.

The synchronizer body 31 illustrated in FIGS. 6 and 7 is an example of embodiment of a synchronizer body according to the subject matter of Claim 6. The synchronizer body 31 is made up of a hub 32, a first shaped sheet metal part 33, a second shaped sheet metal part 34 and an outer toothing 35. The inner toothing 32a is formed on the hub 32 that is separately fabricated. The outer toothing 35 is also separately fabricated. As can be seen in FIG. 7, each of the first and second shaped sheet metal parts 33 and 34 comprises a shaped region 33a and 34a respectively. These shaped regions 33a and 34a together form a reception 37 on the base body 36. A compression spring 38 guided in this reception 37 biases the detent element 7 that is configured as a ball 39 against a securing element 9 formed on the opening of a hole 41 of the outer toothing 35. The securing element 9 is constituted by a rim 40 shaped out of the material of the outer toothing. The hub 32, the outer toothing 35 and the sections 33 and 34 are welded to one another.

What is claimed is:

1. A synchronizer body (1, 14, 24) of a synchronizing device for manual transmissions, said synchronizer body comprising a base body (2, 15, 25), an inner toothing (11, 22), an outer toothing (10, 21) and at least one reception (5, 18, 25) formed in the base body (2, 15, 25) for a spring-loaded detent element (7) wherein the inner toothing (11, 22) of the synchronizer body (1, 14, 24) meshes rotationally fast with a mating toothing of a transmission shaft, the outer toothing (10, 21) of the synchronizer body (1, 14, 24) receives a sliding sleeve, the base body (2, 15) is composed of at least a first shaped sheet metal part (3, 16) and a second shaped sheet metal part (3, 17), the first and second shaped metal parts (3, 4, 16, 17) are made separately by a shaping method and then aligned and fixed to each other at least one radially extending reception (5, 18, 26) comprising an opening toward the sliding sleeve is formed between the shaped sheet metal parts (3, 4) by at least one shaped region (3c, 4c, 18c, 17c), the detent element (7) projecting at least partly out of the opening and acting on the sliding sleeve or on a thrust member is received in the reception (5, 18, 26), and under action of at least one spring (6, 20, 28) supported in the reception, the detent element (7) is biased against a securing element (9) that is arranged on the opening.

2. A synchronizer body of claim 1, wherein the securing element (9) is formed by at least one projection (12, 13) formed plastically on the opening out of the material of at least one of the said shaped sheet metal parts.

3. A synchronizer body of claim 1, wherein the securing element (9) is formed by a bushing (23) comprising a hole (23b) in the bushing (23a), said bushing is slipped onto the detent element (7) and fixed to the reception (18), the detent element (7) extends into the hole (23b) to project partly beyond the bushing (23) toward the sliding sleeve and bears against the bushing bottom (23a).

4. A synchronizer body (24) of claim 1, wherein the securing element (9) is formed by a perforated disk (29) that is anchored on the opening, the detent element (7) extends into the disk (29) to project partly beyond the disk (29) toward the sliding sleeve and bears against the disk (29).

5. A synchronizer body (31) of a synchronizing device for manual transmissions, said synchronizer body comprising a base body (36), an inner toothing (32a), an outer toothing (35) and at least one reception (37) formed with the base body (36) for a detent element (7), wherein the inner toothing (32a) of the synchronizer body (31) meshes rotationally fast with a mating toothing of a transmission shaft, the outer toothing (35) of the synchronizer body (31) receives a sliding sleeve, the base body (36) is composed of at least a first shaped sheet metal part (33) and a second shaped sheet metal part (34), the first and second shaped sheet metal parts (33, 34) are made separately by a shaping method and then aligned and fixed to each other, at least one radially extending cylindrical reception (37) is formed between the shaped sheet metal parts (33, 34) by at least one shaped region (33a, 34a,)

the inner toothing (32a) is configured on a separately fabricate hub (32), the outer toothing (35) is formed by at least two semi-shell-shaped segments or by a separate annular element, the outer toothing (35) and the inner toothing (32a) are aligned to and fixed on the base body (36)

the reception (37) continues into a hole (41) that is made in radial direction in the outer toothing (35) and comprises an opening towards the sliding sleeve, at least one spring-loaded detent element (7) that projects at least partly out of the opening and acts on the sliding sleeve or on a thrust member is received in the reception (37), and under action of at least one spring (38) supported at least on the hub (32), the detent element (7) is biased against a securing element (9) that is arranged on the opening.

6. A synchronizer body (24) of claim 5, wherein the securing element (9) is formed by at least one rim (40) projecting on the opening out of the material of the outer tooting.

7. A synchronizer body (1, 14, 24) of claim 1, wherein the detent element (7) is formd by a ball (8, 19, 39).

8. A synchronizer body (1, 14, 24) of claim 5, wherein the detent element (7) is formed by a ball (8, 19, 39).

9. A synchronizer body (1, 14, 24) of claim 1, wherein the detent element (7) is formed by a pin (27).

10. A synchronizer body (1, 14, 24) of claim 5, wherein the detent element (7) is formed by a pin (27).

* * * * *